United States Patent
Alfaro et al.

(10) Patent No.: US 10,029,404 B2
(45) Date of Patent: Jul. 24, 2018

(54) POLYESTER FILM HAVING LATENT SHRINK PROPERTIES AND PROCESS FOR PRODUCING SAME

(71) Applicant: MITSUBISHI POLYESTER FILM, INC., Greer, SC (US)

(72) Inventors: Jose Alfaro, Greenville, SC (US); Bob Finke, Greer, SC (US); Ghulam Mustafa A. Sange, Greer, SC (US)

(73) Assignee: Mitsubishi Polyester Film, Inc., Greer, SC (US)

( * ) Notice: Subject to any disclaimer, the term of this patent is extended or adjusted under 35 U.S.C. 154(b) by 19 days.

(21) Appl. No.: 14/153,409

(22) Filed: Jan. 13, 2014

(65) Prior Publication Data
US 2014/0124973 A1    May 8, 2014

Related U.S. Application Data

(62) Division of application No. 12/272,469, filed on Nov. 17, 2008, now abandoned.
(Continued)

(51) Int. Cl.
*B29C 55/00* (2006.01)
*C08J 5/18* (2006.01)

(52) U.S. Cl.
CPC .............. *B29C 55/005* (2013.01); *C08J 5/18* (2013.01); *C08J 2367/00* (2013.01);
(Continued)

(58) Field of Classification Search
None
See application file for complete search history.

(56) References Cited

U.S. PATENT DOCUMENTS

| 4,190,168 A | 2/1980 | Jacques |
| 5,043,204 A | 8/1991 | Itaba et al. |

(Continued)

FOREIGN PATENT DOCUMENTS

| EP | 1 262 523 A | 12/2002 |
| EP | 0 951 004 B1 | 12/2003 |

(Continued)

OTHER PUBLICATIONS

Beake et al., Nanoindentation and nanoscratch testing of uniaxially and biaxially drawn poly(ethylene terephthalate) film, Polymer 43 (2002) p. 319-327.
(Continued)

*Primary Examiner* — Jacob T Minskey
(74) *Attorney, Agent, or Firm* — Dority & Manning, P.A.

(57) ABSTRACT

A film layer is disclosed that is capable of shrinking when subjected to energy, such as heat. The film layer, for instance, can be formed and then stretched in one or two directions at a relatively low temperature. In particular, the film is stretched while the film layer is at a temperature near the glass transition temperature of the polymer used to form the film. Drawing the film at a relatively low temperature has been found to improve the shrink properties of the film. In one embodiment, the film layer is comprised of a non-modified polyester, such as polyethylene terephthalate. For example, the polyethylene terephthalate can be made by reacting terephthalic acid with ethylene glycol or polyethylene glycol.

24 Claims, 5 Drawing Sheets

Related U.S. Application Data

(60) Provisional application No. 61/036,746, filed on Mar. 14, 2008, provisional application No. 61/035,159, filed on Mar. 10, 2008, provisional application No. 60/989,644, filed on Nov. 21, 2007.

(52) U.S. Cl.
CPC ...... *C08J 2367/02* (2013.01); *Y10T 428/1328* (2015.01); *Y10T 428/24802* (2015.01); *Y10T 428/24868* (2015.01); *Y10T 428/28* (2015.01); *Y10T 428/31786* (2015.04)

(56) References Cited

U.S. PATENT DOCUMENTS

| | | | |
|---|---|---|---|
| 5,259,912 A | 11/1993 | Cline | |
| 5,259,913 A | 11/1993 | Stover | |
| 5,262,216 A | 11/1993 | Popat et al. | |
| 5,407,752 A | 4/1995 | Fukuzumi et al. | |
| 5,851,610 A | 12/1998 | Ristey et al. | |
| 5,891,537 A | 4/1999 | Yoshii et al. | |
| 6,106,926 A | 8/2000 | Kurz et al. | |
| 6,300,469 B1 * | 10/2001 | Freundlich | B29C 47/0021 264/209.1 |
| 6,379,605 B1 | 4/2002 | Lin | |
| 6,599,994 B2 | 7/2003 | Shelby et al. | |
| 6,627,295 B2 | 9/2003 | Peiffer et al. | |
| 6,630,230 B2 | 10/2003 | Homma et al. | |
| 6,680,097 B1 | 1/2004 | Amberger et al. | |
| 6,699,549 B1 | 3/2004 | Ueyama et al. | |
| 6,720,085 B2 | 4/2004 | Ito et al. | |
| 6,765,070 B2 | 7/2004 | Tamura et al. | |
| 6,780,371 B2 | 8/2004 | Shibano et al. | |
| 6,808,822 B2 | 10/2004 | Rajan et al. | |
| 6,818,271 B2 | 11/2004 | Fearn et al. | |
| 6,875,485 B2 | 4/2005 | Kanai et al. | |
| 6,908,687 B2 | 6/2005 | Mendes et al. | |
| 6,958,178 B2 | 10/2005 | Hayakawa et al. | |
| 6,964,805 B1 | 11/2005 | Kuriyama et al. | |
| 6,984,354 B2 | 1/2006 | Shelby et al. | |
| 7,008,698 B2 | 3/2006 | Marlow | |
| 7,090,907 B2 | 8/2006 | Fearn et al. | |
| 7,128,968 B2 | 10/2006 | Konrad et al. | |
| 7,144,542 B2 | 12/2006 | Holzer et al. | |
| 7,185,453 B2 | 3/2007 | Spear et al. | |
| 7,195,822 B2 | 3/2007 | Hiruma | |
| 7,247,389 B2 | 7/2007 | Umeda | |
| 7,594,348 B2 | 9/2009 | Oosterlinck | |
| 2001/0038920 A1 * | 11/2001 | Hashimoto et al. | 428/480 |
| 2001/0047063 A1 | 11/2001 | Homma et al. | |
| 2004/0175592 A1 | 9/2004 | Douglas et al. | |
| 2005/0276943 A1 | 12/2005 | Iwasa et al. | |
| 2006/0018569 A1 | 1/2006 | Bonenfant | |
| 2006/0204700 A1 | 9/2006 | Kiraly | |
| 2006/0220373 A1 | 10/2006 | Baker | |
| 2006/0222845 A1 * | 10/2006 | Deng | A01N 25/34 428/336 |
| 2006/0233984 A1 | 10/2006 | Suzuki et al. | |
| 2006/0246247 A1 | 11/2006 | Kiraly | |
| 2007/0029790 A1 | 2/2007 | Hudson | |
| 2007/0031691 A1 * | 2/2007 | Forloni et al. | 428/475.2 |
| 2007/0081715 A1 | 4/2007 | Chaput et al. | |
| 2007/0087191 A1 | 4/2007 | Kaya et al. | |
| 2007/0104931 A1 | 5/2007 | Ito et al. | |
| 2007/0122600 A1 * | 5/2007 | Yoshino | B29C 61/003 428/220 |
| 2007/0138122 A1 * | 6/2007 | Shimada | B65D 23/085 215/12.2 |
| 2007/0167576 A1 * | 7/2007 | Kim | C08L 23/10 525/240 |
| 2008/0216889 A1 | 9/2008 | Blong et al. | |
| 2009/0072527 A1 | 3/2009 | Klein et al. | |
| 2009/0126865 A1 | 5/2009 | Baum et al. | |
| 2009/0208682 A1 | 8/2009 | Alfaro et al. | |
| 2013/0164468 A1 | 6/2013 | Hiruma et al. | |

FOREIGN PATENT DOCUMENTS

| | | |
|---|---|---|
| JP | 61-064430 | 4/1986 |
| JP | 2005053576 | 3/2005 |
| WO | WO 00/12288 A1 | 3/2000 |
| WO | WO 00/62273 A1 | 10/2000 |
| WO | WO 2009/066188 A1 | 5/2009 |

OTHER PUBLICATIONS

International Search Report PCT/US2008/083746 filed Nov. 17, 2008 and dated Apr. 24, 2009.
ASTM Test Method D-1003.
Elmhurst College, Virtual Chembook—Condensation Polymers, Retrieved on Nov. 30, 2012. http://www.elmhurst.edu/~chm/vchembook/402condensepolymers.html.
HiFi Industrial Film—Manufacturing process. Retrieved on Nov. 30, 2012. http://www.hififilm.com/html/manufacturingprocess.html.
Merriam-Webster Dictionary: filler; http://www.merriam-webster.com/dictionary/filler; Retrieved on Dec. 29, 2011.
Shimada, Shihji: JP 2005-053576—machine Translation. Mar. 3, 2005.
Semi-Crystalline PET Information, http://www.designinsite.dk/htmsider/m0011.htm, Feb. 3, 2007.

* cited by examiner

POLYESTER FILM HAVING LATENT SHRINK PROPERTIES AND PROCESS FOR PRODUCING SAME

RELATED APPLICATIONS

The present application is a Divisional Application of U.S. application Ser. No. 12/272,469, filed Nov. 17, 2008, which is based upon and claims priority to U.S. Provisional Patent Application Ser. No. 61/036,746, filed on Mar. 14, 2008, U.S. Provisional Patent Application Ser. No. 61/035,159, filed on Mar. 10, 2008, and U.S. Provisional Patent Application Ser. No. 60/989,644, filed on Nov. 21, 2007.

BACKGROUND

Polymer films that are designed to shrink when exposed to heat are useful for many diverse and different applications. Such films, for instance, can be used as packaging materials, binding materials, covering materials, sealing materials, or labeling materials.

When used as a label, for instance, the film may be formed into a tube and then placed around a container. Once placed around the container, the film may be exposed to heat causing the tube to shrink and tightly fit around the container.

In an alternative embodiment, the shrinkable film can be coated with an adhesive and applied to a container. After the container has been used, the container is subjected to heat causing the film to shrink and detach from the container. Once detached, the container can then be cleaned, refilled and reused as desired.

In the past, various different types of films have been proposed for shrink applications. Polyester-based shrink films are particularly advantageous for use on polyester containers, as they facilitate the recycling process by allowing the polyester containers to be reclaimed along with their polyester labels without introducing incompatible resins into the recycling stream. Thus, in the past, polyester polymers have been modified in order to increase their shrink properties. Such polyester films, for instance, are disclosed in U.S. Pat. No. 5,407,752, U.S. Pat. No. 6,630,230, U.S. Pat. No. 6,765,070, U.S. Pat. No. 7,008,698, and U.S. Pat. No. 7,195,822, which are all incorporated herein by reference.

Although the above patents have made great advances in the art, as described above, the polyester polymers were chemically modified or copolymerized with other materials in order to obtain the desired shrink properties.

Various other polymers have also been proposed for use in producing shrinkable films. For instance, in U.S. Pat. No. 6,680,097, which is also incorporated herein by reference, self-adhesive film labels are disclosed containing a stretched film layer, which shrinks when subjected to elevated temperatures. In the '097 patent, polyvinyl chloride is taught as the preferred material used to form the shrinkable film. The '097 patent also discusses using shrinkable polyester films. The polyester films, however, are shown to have less than 10% shrinkage when subjected to a temperature of 80° C. and generally showed a significantly more weakly pronounced longitudinal shrinkage when compared to PVC films.

Various disadvantages, however, may be experienced when attempting to use polyvinyl chloride as a shrinkable film. Polyvinyl chloride resins, for instance, have had problems with heat resistance, weather resistance, chemical resistance, and the like. Polyvinyl chloride films, for instance, are liable to experience the frequent occurrence of fish eye when the film is subjected to printing. Further, problems have also been experienced in properly disposing polyvinyl chloride films, especially when trying to incinerate the films.

In view of the above, a need currently exists for an improved shrinkable film. In particular, a need currently exists for a shrinkable film made from a polyester polymer that does not necessarily have to be modified or combined with other polymers in order to impart desirable shrink properties.

SUMMARY

In general, the present disclosure is directed to a shrinkable film product. The film product, for instance, includes at least one film layer that shrinks when exposed to sufficient amounts of a suitable energy, such as heat. Of particular advantage, in one embodiment, the shrinkable film layer can be formed primarily from a non-modified polyester polymer. As used herein, an "non-modified" polyester polymer refers to a polyester polymer in which one of the monomers to form the polymer has not been at least partially replaced with an additional monomer and/or does not include polyester polymers that have been copolymerized with other polymers. For example, in one embodiment, the polyester polymer can be formed through a polycondensation reaction essentially from a glycol with a dicarboxylic acid. For example, in one particular embodiment, the polyester polymer comprises polyethylene terephthalate formed essentially from polyethylene glycol and terephthalic acid.

It should be understood, however, that in other embodiments a modified polyester may be used.

Shrinkable films are made according to the present disclosure by stretching or drawing the films while at a relatively low temperature, such as near the glass transition temperature of the polymer. As used herein, the glass transition temperature is determined using differential scanning calorimetery (DSC). The present inventors have discovered that cold drawing the film can significantly enhance the shrink properties of the polymer.

In one embodiment, for instance, the present disclosure is directed to a process for producing a shrinkable film. The process includes the steps of first forming a film layer that comprises a polyester polymer. The polyester polymer may comprise, for instance, polyethylene terephthalate. In one embodiment, the polyester polymer is non-modified. For instance, the polyester polymer can comprise the polycondensation reaction product of primarily a single diol, such as polyethylene glycol, and terephthalic acid.

The film layer can be initially formed by heating the polyester polymer to form a molten polymer and then extruding the molten polymer through an extruder to form the film.

After the film layer is formed, the film layer is cooled to a temperature near the glass transition temperature of the polyester polymer. In accordance with the present disclosure, the film layer is then thereafter stretched in at least one direction. For instance, in one embodiment, the film layer can be uniaxially stretched. Alternatively, the film layer may be biaxially stretched such as in both the longitudinal direction and the lateral direction. The film layer can be stretched, for instance, from about 1 to about 5 times its original length, such as from about 3 times to about 4 times its original length in one or both directions.

In order to cool the film layer after being formed, in one embodiment, the film layer can be conveyed over the surface of a chilled roller. The surface of the chilled roller can be at a temperature, for instance, of less than about 30° C., such as less than about 25° C. Once cooled, the film layer can be stretched. For example, in one embodiment, the film layer can be cooled to a temperature of less than about 120° C., such as less than about 100° C., such as less than about 90° C., such as from about 60° C. to about 120° C. In one embodiment, after being stretched, the film layer is not subjected to any heat treatment or annealing.

Films made in accordance with the present disclosure can be used in numerous products and have various benefits and advantages. Film layers made according to the present disclosure, for instance, can be at least partially crystalline after being stretched and can be configured to shrink at least 10% in at least one direction when subjected to a temperature of 80° C. for three minutes. For instance, in one embodiment, film layers can be produced from a polyester polymer that can shrink from about 10% to about 40%, such as from about 20% to about 40% when subjected to a temperature of 80° C. for three minutes. As described above, shrinkage can occur in only one direction or, alternatively, shrinkage can occur in both the longitudinal direction and the lateral direction.

Film products made according to the present disclosure can comprise a monolayer product containing the polyester polymer or can comprise a coextruded product having a plurality of layers. When containing a plurality of layers, each layer can be made from the same polymer or from a different polymer.

In one embodiment, the film product can be incorporated into a label. In one particular application, for instance, the label may include an adhesive layer positioned on an exterior surface. The adhesive layer may be for adhering the label to a container or other object. After the container or other object has been used, the label can then be washed off by subjecting the label to water at an elevated temperature.

In an alternative embodiment, the film product of the present disclosure can be formed into a tube and then placed around a container. In this embodiment, the tube can be subjected to heat or another energy source that causes the tube to shrink and tightly fit around the container.

When the film product is incorporated into a label, in one embodiment, the label may include a print layer. For instance, in one embodiment, the print layer can be positioned in between an adhesive layer and the film layer containing the polyester polymer. In an alternative embodiment, the film layer containing the polyester polymer may be positioned in between the adhesive layer and the print layer.

Other features and aspects of the present disclosure are discussed in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

Figure 1:
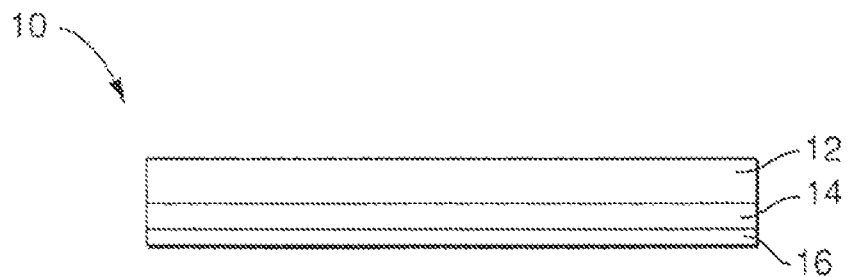
FIG. 1 is a cross sectional view of one embodiment of a film product made in accordance with the present disclosure.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present invention.

In general, the present disclosure is directed to a shrinkable film made from a polyester polymer. The film can be used in numerous products and applications. For instance, films made according to the present disclosure may be used as a packaging material in order to shrink wrap perishable and non-perishable goods. The film can also be incorporated into binding materials, covering materials, and sealing materials. In yet another embodiment, the film can be incorporated into a label that is applied to a container. The latent shrink properties of the film can be used to either adhere the label to a container in a shrink wrap process or to remove the label from the container once the container has been emptied or otherwise used.

The shrinkable film layer of the present disclosure is generally made from a polyester polymer. In order to enhance the shrink properties of the film, the film is uniaxially or biaxially stretched while the film is at a relatively low temperature. For instance, in accordance with the present disclosure, the film is subjected to a "cold draw" process by which the film is drawn in one direction or in two directions while at a temperature of less than about 120° C. such as near the glass transition temperature of the polyester polymer. For instance, each time the film is stretched, the film can be at a temperature that is within about 30%, such as within about 25%, such as within about 20%, such as within about 15% of the glass transition temperature of the polymer (above or below). After the film is stretched, the film is generally not subjected to any heat treatment or annealing process.

The present inventors have discovered that by drawing the film at relatively low temperatures, the shrink properties of the film are greatly enhanced when the film is later subjected to energy, such as heat. Although unknown, it is believed that by drawing the film at a relatively low temperature, the film assumes a crystalline structure that, when later heated, causes the film to retract and shrink a great deal more than if the film were stretched at a higher temperature.

Films made according to the present disclosure, for example, shrink at least 10% of their length in at least one direction when subjected to a temperature of 80° C. for three minutes. The films can be subjected to the above temperature by, for instance, submerging the film into a water bath, contacting the film with a heated gas, such as air, contacting the film with radiation such as infrared radiation, or by otherwise heating the film. Films made according to the present disclosure typically shrink in each direction that the film has been stretched. Thus, if the film has been biaxially stretched at a relatively low temperature, then the film will shrink in both the longitudinal direction and the lateral direction when subjected to energy in a sufficient amount.

The amount of shrinkage incorporated into the film can vary depending upon different factors. For instance, in certain embodiments, the film may shrink at least 20%, such as at least 30%, such as at least 40%, such as at least 50%, such as even greater than about 60% in at least one direction when subjected to a temperature of 80° C. for three minutes. In addition, the film can be constructed so as to have dual shrink properties meaning that the film can stretch not only in the longitudinal direction, but also in the lateral direction. In fact, films can be constructed so that they will shrink in both the longitudinal direction and in the lateral direction in the amounts described above.

In one particular embodiment, for instance, a polyester film can be constructed according to the present disclosure that begins to shrink at temperatures less than 70° C., such at temperatures of less than 65° C. when, for instance, submerged in a water bath. For example, polyester films made according to the present disclosure can shrink from about 2% to about 5% in both the longitudinal direction and the lateral direction when submerged in a water bath at a temperature of 60° C. At 70° C., the films can shrink at least 10% in both the longitudinal direction and the lateral direction, such as in an amount from about 10% to about 25%. At 80° C., the films can shrink at least about 15% in both directions, such as from about 15% to about 30%. At 90° C., the films can shrink at least about 20% in both directions, such as from about 20% to about 35%. At 100° C., the films can shrink in both directions in an amount of greater than about 25%, such as from about 25% to about 40% or greater.

During shrinking, the films display a force in the direction of contraction known as the shrink force. Films made according to the present disclosure, for instance, can display a maximum shrink force of greater than about 5 N/15 mm, such as greater than about 8 N/15 mm, such as greater than about 10 N/15 mm, such as greater than about 12 N/15 mm, such as even greater than about 15 N/15 mm. For instance, the films can display a shrink force in the longitudinal direction or machine direction in an amount from about 5 N/15 mm to about 10 N/15 mm. In the transverse direction, on the other hand, the films can display a shrink force of from about 8 N/15 mm to about 15 N/15 mm. The maximum shrink force can occur at a temperature of from about 65° C. to about 85° C.

Films made according to the present disclosure can also be relatively stiff in comparison to other polyester films at the same thickness. Increased stiffness can provide various advantages. For instance, the relatively stiff film may be easier to handle when applied or removed from an adjacent object.

Of particular advantage, in one embodiment, the polyester polymer used to form the film can be non-modified. In the past, for instance, non-modified polyester polymers were generally considered not to have sufficient shrinkage properties for incorporation into many shrink applications. Thus, in order to increase the shrinkage properties of the polymer, the polyester polymers were typically chemically modified or copolymerized. In accordance with the present disclosure, however, a film made primarily from an non-modified polyester polymer can be constructed so as to shrink from about 10% to about 40% or even greater in at least one direction when subjected to a temperature of 80° C. for three minutes.

The shrinkable film layer, for instance, can contain the non-modified polyester polymer in an amount greater than 60% by weight, such as greater than 70% by weight, such as greater than 80% by weight, such as greater than 90% by weight, such as even greater than about 95% by weight.

The polyester polymer used to form the film layer in accordance with the present disclosure may comprise the polycondensation reaction product of a glycol or diol with a dicarboxylic acid or its ester equivalent. Dicarboxylic acids that may be used include terephthalic acid, isophthalic acid, sebacic acid, malonic acid, adipic acid, azelaic acid, glutaric acid, suberic acid, succinic acid, and the like, or mixtures of two or more of the following may be used. Suitable glycols include ethylene glycol, diethylene glycol, polyethylene glycol and polyols such as butane diol and the like. The polyester may comprise, for instance, polyethylene terephthalate, polyethylene naphthalate or polybutylene terephthalate.

When using a non-modified polyester to produce the film layer, for instance, the polyester may comprise essentially the reaction product of the dicarboxylic acid with a glycol or diol. For instance, in one particular embodiment, the polyester polymer comprises a non-modified polymer consisting essentially of the polycondensation reaction product of ethylene glycol, diethylene glycol, or polyethylene glycol and terephthalic acid to produce polyethylene terephthalate.

It should be understood, however, that modified polyesters may also be used in the process. In particular, the cold drawing process of the present disclosure may also increase the shrinkage properties of chemically modified polymers, which includes copolymers. For instance, in one embodiment, the polyester polymer may comprise a copolyester polymer such as polyethylene terephthalate isophthalate.

Modified polyesters that may be used in the present disclosure include, for instance, polymers that are formed from modified acids and/or modified glycols. In one embodiment, for instance, the polyester polymer might be only slightly modified. For instance, less than 10 mole percent, such as less than about 5 mole percent of the acid component and/or the glycol component can be modified.

In another embodiment, a modified polymer may be used that comprises a blend of polyester polymers. For instance, a film can be produced from a polyester polymer blended with a copolyester. Such polyester blends are disclosed, for instance, in U.S. Pat. No. 6,599,994, which is incorporated herein by reference.

In producing the shrinkable film layer, the polyester polymer may be combined with various additives as may be desired. Such additives can include, for instance, fillers that may impart slip, opacity or color, lubricants, antioxidants, and the like. Fillers that may impart a slipping property into the film layer, for example, may include inorganic particles such as microparticles of silica, talc, kaolin, and calcium carbonate, organic polymer microparticles such as those of poly(meta)acrylic resin, polystyrene resin, and polytetrafluoroethylene resin, cross-linked microparticles of these organic polymers and the like. These particles can have a mean particle diameter, for instance, of from about 0.1 to about 10 microns.

Fillers can also be added to the film layer in order to provide color. In this embodiment, for instance, the filler or pigment may comprise, for instance, titanium dioxide particles, metal oxide particles, carbon particles, and the like. In general, any suitable pigment particle may be incorporated into the film in order to provide the film layer with the proper color and/or opacity.

Other additives that may be incorporated into the film layer may include, for instance, lubricants, such as calcium stearate, sodium stearate, magnesium stearate, and the like, antioxidants, delusterants, and/or antistatic agents.

In order to form the film layer, in one embodiment, the film layer can be produced through an extrusion process. For example, the polyester polymer and any additives used to form the film layer can be melted and then extruded into a sheet onto a polished revolving casting drum to form a cast film. The film can then be quickly cooled and then stretch oriented in one or more directions. In accordance with the present disclosure, as described above, the film is cooled to a temperature near the glass transition temperature of the polyester polymer prior to stretching.

The formed film can be cooled using any suitable method or technique. In one embodiment, for instance, the film may be contacted with a rotating chilled roller. The chilled roller, for instance, may include an outside surface that is brought into contact with the film. The roller may be cooled using any suitable technique, such as by circulating cold water through the roller. For example, in one embodiment, the surface temperature of the roller may be less than about 40° C., such as less than about 30° C., such as from about 15° C. to about 25° C.

The film layer is contacted with the surface of the roller an amount of time sufficient to lower the temperature of the film layer to near or below the glass transition temperature of the polyester polymer. The glass transition temperature of the polymer may depend, for instance, on the crystallinity of the polymer. The more crystalline the polymer is, for instance, the higher the glass transition temperature.

When the formed film is cooled as described above and effectively quenched, the film, in one embodiment, can be primarily amorphous. When processing polyethylene terephthalate, for example, the glass transition temperature of the amorphous film can be approximately 67° C. After being cooled, the film layer can then be stretched in either one direction or in both the longitudinal direction and the lateral direction. In one embodiment, for instance, the film layer after being cooled can be first stretched in the longitudinal direction, which is sometimes referred to as the machine direction. The film can be stretched in the machine direction using, for instance, one or more draw rollers. The film layer, in one embodiment, can be stretched in the longitudinal direction while at a temperature that is within about 30% of the glass transition temperature. For instance, the film layer can be stretched while at a temperature that is within at least about 25%, such as at least about 20%, such as within about 15% of the glass transition temperature of the polymer.

Alternatively, the film layer can be stretched within a particular temperature range without reference to the glass transition temperature. For instance, the film layer can be stretched in the machine direction while at a temperature of from about 55° C. to about 120° C., such as from about 70° C. to about 110° C.

Stretching the film in the longitudinal direction will generally increase the crystallinity of the film and therefore increase the glass transition temperature (such as to about 80° C.). In one embodiment, after being stretched in the longitudinal direction, the film can then be stretched in the lateral direction. For instance, in one particular embodiment, the film can be reheated while on a tenter frame to a temperature that is within about 30% of the new glass transition temperature of the polymer, such as within about 25% of the new glass transition temperature, such as within about 20% of the new glass transition temperature, such as within about 15% of the new glass transition temperature. When heated on a tenter frame, the tenter frame generally travels through an oven during or prior to stretching. While on the tenter frame, the film typically enters a crystallizing zone. According to the present disclosure, the temperature within the crystallizing zone, in one embodiment, can be from about the dew point to about 70° C., such as from about the dew point to about 50° C.

As explained above, in one embodiment, the film can be stretched in only a single direction. The single direction can be the longitudinal direction or the lateral direction. When only stretching the film in the lateral direction, for instance, the film may be immediately placed on the tenter frame after formation and stretched as opposed to being reheated as described above.

Regardless of the glass transition temperature, the temperature of the film layer during stretching in the transverse direction, in one embodiment, can vary from about 60° C. to about 120° C., such as from about 70° C. to about 100° C. Stretching can be primarily carried out using a mechanical force as opposed to heating the polymer to a temperature sufficient for the polymer to flow.

Stretching the film as described above has been found to increase the latent stretch properties of the polymer. In addition, stretching the film also imparts strength and toughness to the film. As explained above, films made according to the present disclosure also have great stiffness properties making the films easier to handle. For instance, the films generally are stiffer than many comparative films allowing for higher application speeds and for lower thicknesses.

The amount the film is stretched can depend upon various factors. When uniaxially stretched, the film can be stretched in one direction (such as the machine direction or the cross machine direction) in an amount from about 1 time to about 5 times its original length, such as from about 3 times to about 4 times its original length. When biaxially stretched, the film can be stretched in a perpendicular direction in an amount from about 1 time to about 5 times its original length, such as from about 3 times to about 4 times its original length. In general, the greater the amount the film is stretched, the greater amount of latent shrink is incorporated into the product.

The final thickness of the film layer can vary depending upon the amount the film layer is stretched and the particular application for which the film layer is to be used. In general, the film layer can have a thickness of from about 10 microns to about 500 microns or greater. In one embodiment, for instance, the film layer can have a thickness of less than about 150 microns, such as from about 35 microns to about 55 microns.

In some applications, it may be desirable to control the amount of haze that is contained in the film layer after being formed. The present inventors have discovered that by carefully controlling the temperature of the film during stretching and the amount the film is stretched, the amount of haze incorporated into the film layer can be minimized while also dramatically increasing the stretch properties of the film. In general, stretching the film at temperatures much lower than the glass transition temperature of the polymer may increase the haze of the film. Thus, when haze is an important attribute of the resulting product, stretching may occur while the temperature of the film layer is not more than about 10° C., such as not more than about 5° C. lower than the glass transition temperature. Film layers made according to the present disclosure can have less than about 8% haze, such as less than about 5% haze, such as even less than about 3% haze. Haze is determined according to ASTM Test Method D-1003.

When incorporating the shrinkable film layer of the present disclosure into a usable product, the film layer may be used alone or in combination with other layers. For instance, the film layer may be coextruded with other polymer layers or may be adhesively secured to other layers after the film layer has been formed.

When coextruding the shrinkable film layer with other layers, the other layers may comprise the same polymer or a different polymer. For instance, in one embodiment, two or more film layers may be extruded together all comprising the same polyester polymer. Different additives, such as an anti-slip agent or pigment particles, may be included in each of the layers in different amounts for a desired result.

In an alternative embodiment, different polymers may be incorporated into the different film layers. The different polymer may comprise, for instance, a polyolefin polymer, such as polyethylene or polypropylene or another type of polyester polymer. For instance, in one embodiment, a film product can be produced containing a shrinkable film layer comprising an non-modified polyester polymer that is coextruded with at least one other film layer containing a modified polyester polymer.

If desired, a composite film can be produced having multiple layers in which each layer has different shrink properties. For instance, one film layer may shrink greater than 10%, such as greater than 20%, such as greater than 30%, such as greater than 40%, such as even greater than 50% in one direction as opposed to another layer contained within the composite film.

As described above, the film layer of the present disclosure may be used in numerous applications. In one embodiment, for instance, the shrinkable film layer can be incorporated into a label for application to a container, such as a beverage container. When incorporated into a label, the shrink properties of the film layer may be utilized in different ways. For instance, in one embodiment, the shrinkable film layer may be used to shrink wrap the label onto the container. In an alternative embodiment, the shrink layer can be used to remove the label from the container, once the container has been used.

Figure 2:
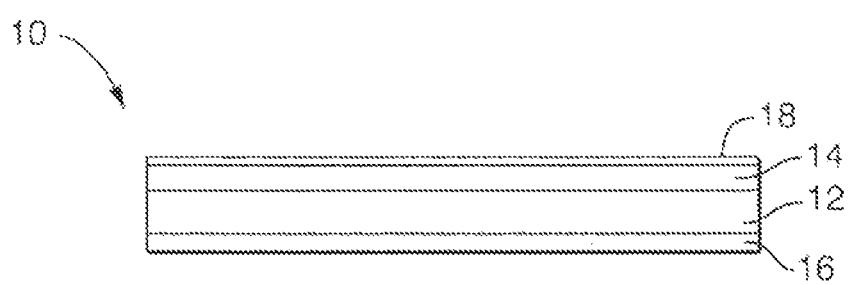
FIG. 2 is a cross sectional view of another embodiment of a film product made in accordance with the present disclosure.
Figure 3:
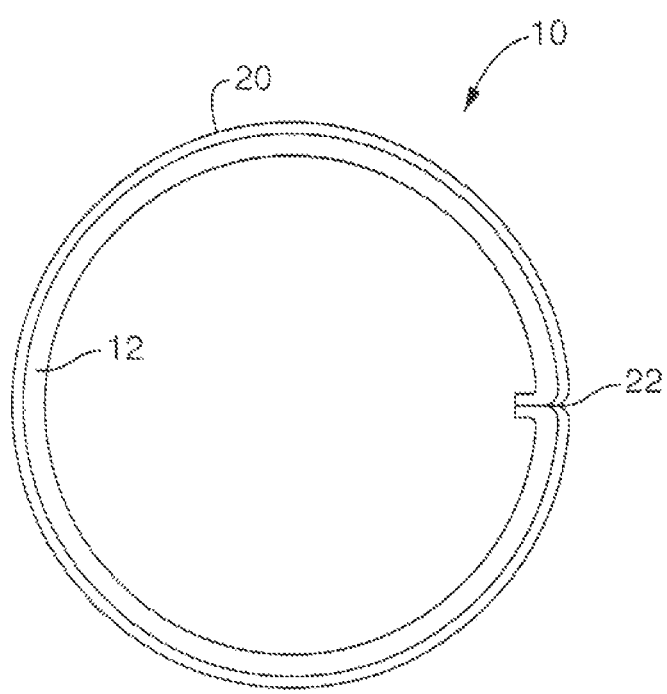
FIG. 3 is a cross sectional view of still another embodiment of a film product made in accordance with the present disclosure that has been formed into a tube.

Referring to FIGS. 1 through 3, various embodiments of labels made in accordance with the present disclosure are shown. For instance, a label 10 is shown in FIG. 1. As illustrated, the label includes a film layer 12 made in accordance with the present disclosure. In particular, film layer 12 is made from a polyester polymer that is shrinkable when exposed to heat. The film layer 12 may comprise a monolayer film or may comprise multi-layers of film that have been coextruded together. For instance, in one embodiment, three layers all made from a polyester polymer are coextruded together to form the composite layer 12.

Adjacent to one surface of the film layer 12 is a print layer 14. The print layer 14 is intended to be visible through the shrinkable film layer 12. Thus, in this embodiment, the film layer 12 is transparent or at least translucent. The print layer 14 may comprise, for instance, any suitable printed design or wording as may be necessary or desired for the particular application.

Opposite the print layer 14 is an adhesive layer 16 for adhering the label 10 to a container or adjacent surface. The adhesive layer 16 may comprise any suitable adhesive. The adhesive used to produce the adhesive layer 16 may be selected, for instance, based upon whether or not the label is intended to be shrunk and washed off later and depending upon the type of surface that the label is to be adhered to.

In one embodiment, for instance, the adhesive layer may contain a hot melt adhesive, a glue, a radiation curing adhesive, or a thermally melting adhesive.

When label 10 comprises a wash-off label, for instance, the adhesive may comprise an aqueous acrylate dispersion. Still other adhesives include water-soluble adhesives, water-swellable adhesives, adhesives that include water-soluble or water-swellable backbone binders, and the like. For instance, the adhesive may be based upon an acrylate, polyvinyl alcohol, polyglycolic acid, a polylactide, and the like.

In an alternative embodiment, the adhesive may comprise a pressure sensitive adhesive or a thermally sensitive adhesive. Solvent adhesives are also suitable for use in the present disclosure. Solvent adhesives may contain, for instance, natural or synthetic rubber, such as styrene-butadiene-styrene block copolymers, styrene-isoprene-styrene block copolymers, and the like.

When used in a wash-off label application, the label 10 as shown in FIG. 1 is applied to a container. Once the container has been used and it is desirable to remove the label, the container is then immersed in a hot aqueous bath. The bath may contain, for instance, water combined with a base, such as sodium hydroxide. The temperature of the water may be from about 70° C. to about 90° C. Once submerged in the hot water, the film layer 12 shrinks causing the entire label to detach from the container.

Another embodiment of a label 10 made in accordance with the present disclosure is shown in FIG. 2. Like reference numerals have been used to indicate similar elements. In this embodiment, the shrinkable film layer 12 is positioned in between the adhesive layer 16 and a print layer 14. As shown, in this embodiment, the print layer 14 is no longer protected by the film layer 12. Thus, the label 10 may further include a protective layer 18. The protective layer 18 may comprise, for instance, a lacquer or a protective film layer.

Referring to FIG. 3, still another embodiment of a label 10 made in accordance with the present disclosure is shown. Again, like reference numerals have been used to indicate similar elements. In the embodiment illustrated in FIG. 3, the label 10 is in the form of a tube that is intended to be shrink wrapped onto a container.

As shown, the label 10 includes a film layer 12 made in accordance with the present disclosure. In particular, the film layer 12 is comprised of a polyester polymer and is shrinkable when exposed to energy, such as heat.

The label 10 further includes a seam 22 formed by bonding together the two ends of the composite film. In order to facilitate bonding, the label 10 further includes a skin layer 20. The skin layer 20 can be, for instance, coextruded with the film layer 12 and can be made from a material that allows for the ends of the composite film to bond together.

For example, in one embodiment, the ends of the composite film can be bonded together using a solvent. More particularly, a solvent is contacted with the skin layer 20 which causes the skin layer to bond to the film layer 12 and form the seam 22.

Examples of skin layers that may be used in accordance with the present disclosure are disclosed, for instance, in U.S. Pat. No. 5,407,752 and in U.S. Pat. No. 6,765,070. For instance, in one embodiment, the skin layer comprises a polyester polymer comprised of a dicarboxylic acid component composed mainly of an aromatic dicarboxylic acid or its ester forming derivative and a diol component composed mainly of ethylene glycol and an ethylene oxide adduct of a bisphenol compound or its derivative. The dicarboxylic acid component may include, for instance, terephthalic acid and isophthalic acid or their ester forming derivatives.

In an alternative embodiment, the skin layer may comprise a copolymerized polyester resin comprising a polyethylene terephthalate resin and a polybutylene terephthalate resin, wherein the polyethylene terephthalate resin is present in an amount from about 50% to about 95% by weight based on the total amount of the resin present. In this embodiment, the polyethylene terephthalate resin may be produced by reacting terephthalic acid and isophthalic acid with ethylene glycol. The isophthalic acid may be present in an amount from about 3 to about 30 mol percent based upon the total amount of dicarboxylic acids present. In addition, the ethylene glycol may be present in conjunction with cyclohexan dimethanol in an amount from about 3 to about 40 mol percent based upon the total diols present.

In addition to the above, any suitable skin layer may also be used.

When bonding the skin layer 20 to the film layer 12, a solvent, such as tetrahydrofuran or 1,4 dioxylene are contacted with the skin layer at the desired area and the skin layer is then brought into contact with the film layer 12.

The present disclosure may be better understood with reference to the following Example.

EXAMPLES

Example 1

Two different film samples made in accordance with the present disclosure were produced and tested for their shrinkage characteristics.

The film samples were made from a polyethylene terephthalate (PET) homopolymer. In order to produce the film samples, the PET resin was melted and extruded to form a molten film layer. In particular, the molten polymeric material was extruded into a sheet onto a polished revolving casting drum to form a cast film. The film was formed at a temperature of from about 280° C. to about 290° C. The film was quickly quenched by contacting the film with a chilled roller at a temperature of about 19° C. The residence time on the chilled roller was from about 5 seconds to about 6 seconds.

After being quenched, the film was fed through a plurality of rollers and drawn or stretched in the machine direction. An infrared heater heated the film during stretching. The film temperature during stretching was from about 70° C. to about 110° C. The film was stretched in the machine direction from about 2.5 times to about 4 times its original length.

After being stretched in the machine direction or longitudinal direction, the film was once again quenched by contacting the film with a chilled roller at a temperature of about 20° C. After quenching, the film was placed on a tenter frame, reheated in an oven and coated with a print receptive coating. The film was then stretched in the transverse direction from about 3 times to about 5 times its original length. After being stretched, the film was then allowed to cool.

Two different film samples were produced. The first sample, Sample No. 1, was heated to lower temperatures after being stretched in the machine direction. In particular, the first sample was preheated in an oven at a temperature of 70°-90° C. and then stretched in the transverse direction at a temperature of from about 70° C. to about 85° C.

The second sample, Sample No. 2, on the other hand, was preheated in an oven at a temperature of about 90°-110° C. and then stretched in the transverse direction at a temperature of from about 85° C. to about 100° C.

All of the film samples had a thickness of 45 microns.

The two film samples were then tested for their stretch characteristics. In particular, each film sample was cut into sample specimens having dimensions of about 4 inches×4 inches. The films were then submerged in agitated water baths at different temperatures. Once in the water baths for 5 minutes, the dimensions of the specimens were once again measured to determine the amount of shrinkage. The results are illustrated in FIG. 4.

Figure 4:
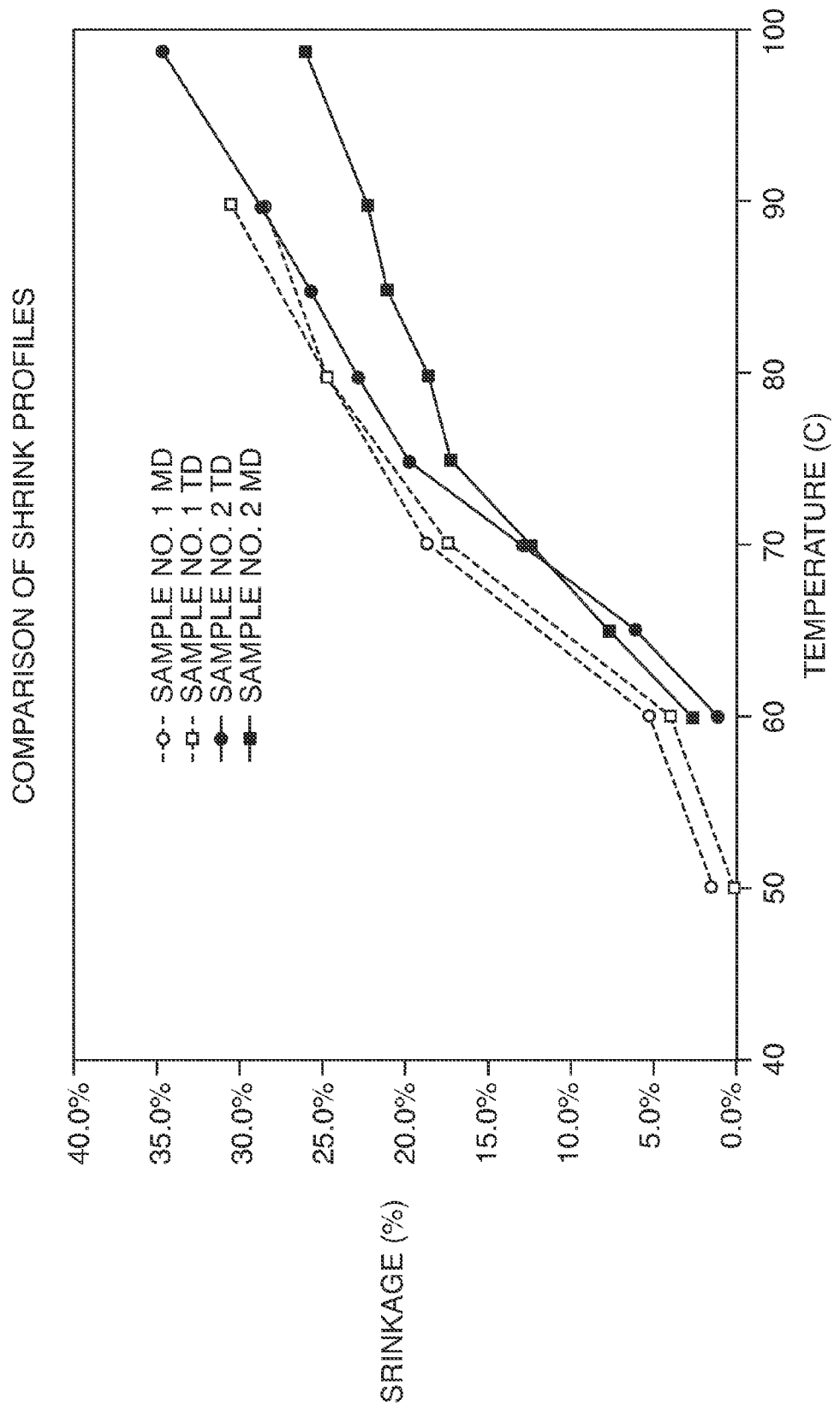
FIGS. 4 through 6 are graphical representations of the results obtained in the Examples below.

As shown in FIG. 4, Sample No. 1 tended to shrink in greater amounts at lower temperatures.

As also shown in FIG. 4, the amount of shrinkage in the machine direction is comparable to the amount of shrinkage that occurred in the transverse direction.

As shown, films can be made according to the present disclosure that shrink at least 2%, such as at least 5% at a temperature of 60° C. The film samples also shrunk at least 10%, such as from about 10% to about 20% at 70° C. At 80° C., the film samples shrunk in an amount from about 15% to about 25%.

Example 2

Ten different film samples were made generally according to the process described in Example No. 1. In this example, the film samples were tested for shrink force, which refers to the amount of force the film exhibits during shrinking.

As described in Example No. 1 above, PET homopolymer resin was melted and extruded to form a molten film layer. The film was quickly quenched by contacting the film with a chilled roller at a temperature of from about 18° C. to about 20° C. After being quenched, the film was fed through a plurality of rollers and stretched in the machine direction. The temperature of the film during machine direction stretching was from about 70° C. to about 110° C. The draw ratio in the machine direction was from about 2.5 to about 4.

After being stretched in the machine direction, the film was once again quenched by contacting the film with a chilled roller. After quenching, the film was placed on a tenter frame, coated with a print receptive coating, and reheated in an oven. The film was stretched in the transverse direction at a draw ratio of from about 3 to about 5. The temperature of the film during stretching in the transverse direction varied from about 73° C. to about 90° C. In particular, the temperature of the film was measured during initial stretching and during final stretching. During initial stretching in the transverse direction, the temperature of the film was from about 73° C. to about 85° C. The temperature of the film at the end of the transverse stretch, on the other hand, was from about 82° C. to about 90° C. All of the film samples had a thickness of 45 microns.

Once the film samples were produced, shrink force measurements were taken using an AR1000-N rheometer produced by TA Instruments. In order to heat the film during testing, an environmental test chamber clamshell-type oven was used. Film samples were placed between two opposing chucks on the rheometer and heated in the oven. The starting temperature of the film was 15° C. The temperature was then increased at a rate of 1° C. per minute until the oven reached a temperature of 100° C. The inter-grip distance used was 37.5 mm. All of the test specimens had a width of 15 mm.

During testing, the torsional movement of the rheometer was nulled or zeroed. After each sample was clamped into place, the clamshell-type oven was closed around the sample. The temperature in the oven was then increased and the force exerted between the clamps during shrinkage of the film was recorded. Results were recorded in Newtons per 15 mm width. The following results were obtained:

| Maximum Shrinkage Force in Newtons/15 mm Width | | |
| --- | --- | --- |
| Sample No. | Machine Direction | Transverse Direction |
| Sample 1 | 8.0 | 11.2 |
| Sample 2 | 6.7 | 9.3 |
| Sample 3 | 6.0 | 8.1 |

-continued

Maximum Shrinkage Force in Newtons/15 mm Width

| Sample No. | Machine Direction | Transverse Direction |
|---|---|---|
| Sample 4 | 8.0 | 10.1 |
| Sample 5 | 7.5 | 9.4 |
| Sample 6 | 6.3 | 9.1 |
| Sample 7 | 8.0 | 10.0 |
| Sample 8 | 7.8 | 10.2 |
| Sample 9 | 7.8 | 9.5 |
| Sample 10 | 7.1 | 9.2 |

Minutes From Shrinkage Onset to Shrinkage Maximum

| Sample No. | Machine Direction | Transverse Direction |
|---|---|---|
| Sample 1 | 9.5 | 13.5 |
| Sample 2 | 9.1 | 14.1 |
| Sample 3 | 9.6 | 16.8 |
| Sample 4 | 7.8 | 9.5 |
| Sample 5 | 8.6 | 12.7 |
| Sample 6 | 9.0 | 14.5 |
| Sample 7 | 9.7 | 12.6 |
| Sample 8 | 9.0 | 13.2 |
| Sample 9 | 9.2 | 12.1 |
| Sample 10 | 9.1 | 11.8 |

Temperature (° C.) of Shrinkage Onset

| Sample No. | Machine Direction | Transverse Direction |
|---|---|---|
| Sample 1 | 63.3 | 64.1 |
| Sample 2 | 65.3 | 64.8 |
| Sample 3 | 65.7 | 65.4 |
| Sample 4 | 60.6 | 61.3 |
| Sample 5 | 61.6 | 60.9 |
| Sample 6 | 64.8 | 66.4 |
| Sample 7 | 62.9 | 62.9 |
| Sample 8 | 65.1 | 63.6 |
| Sample 9 | 64.0 | 63.8 |
| Sample 10 | 63.8 | 64.3 |

Temperature (° C.) at Maximum Shrinkage Force

| Sample No. | Machine Direction | Transverse Direction |
|---|---|---|
| Sample 1 | 72.8 | 77.6 |
| Sample 2 | 74.4 | 78.9 |
| Sample 3 | 75.3 | 82.2 |
| Sample 4 | 68.4 | 70.8 |
| Sample 5 | 70.2 | 73.6 |
| Sample 6 | 73.8 | 80.9 |
| Sample 7 | 72.6 | 75.5 |
| Sample 8 | 74.1 | 76.8 |
| Sample 9 | 73.2 | 75.9 |
| Sample 10 | 72.0 | 76.1 |

Figure 5:
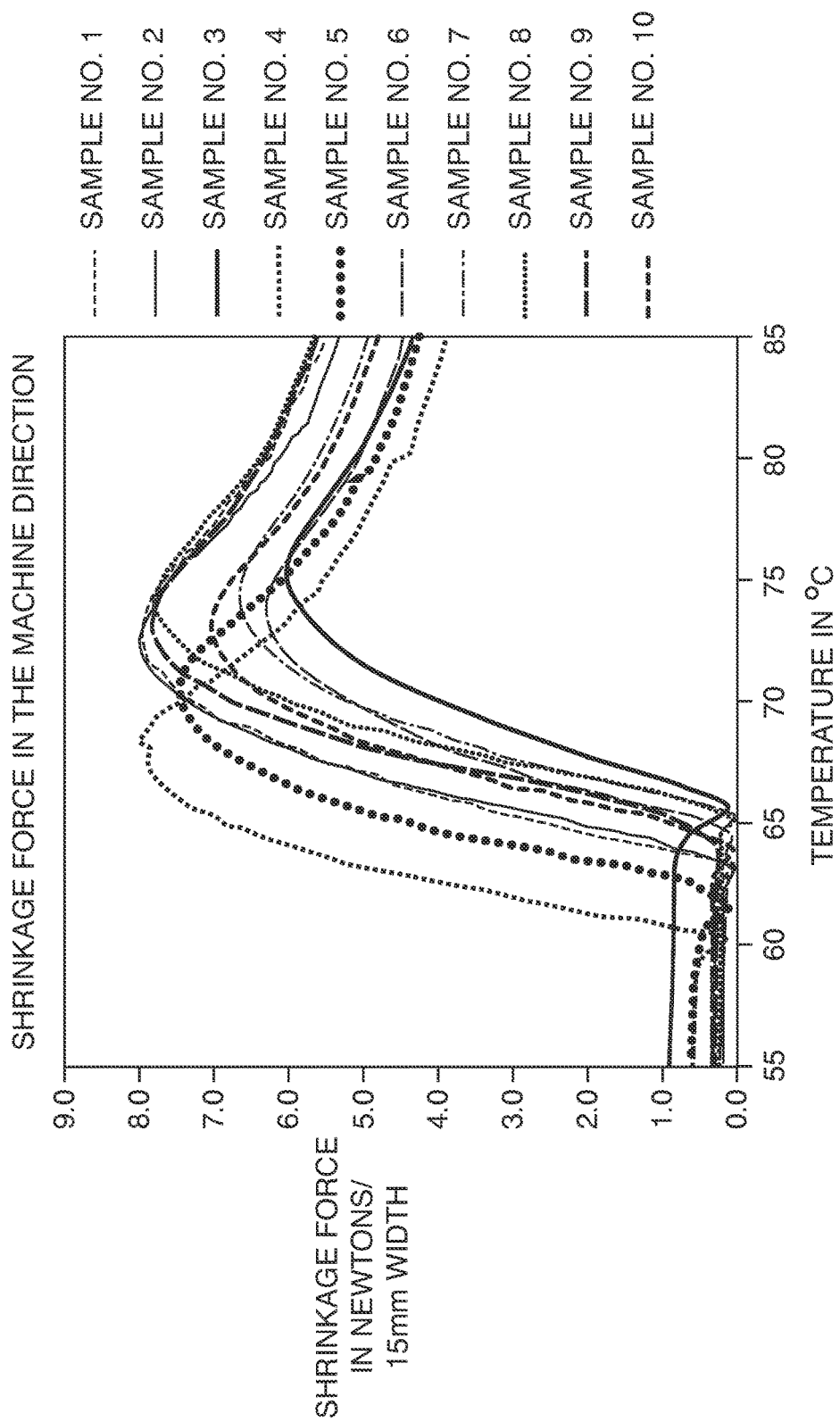
Figure 6:
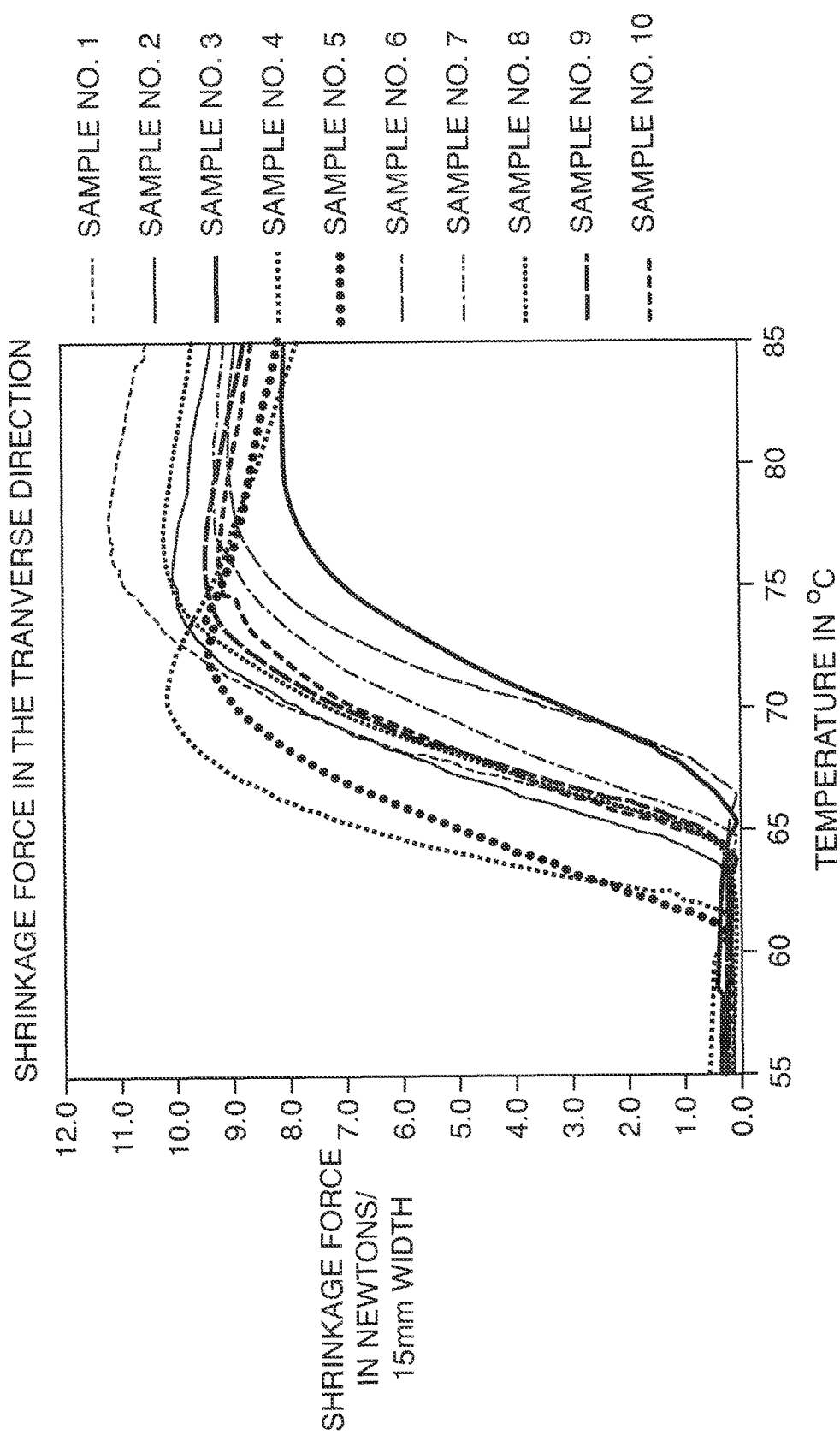

The results are also illustrated in FIGS. 5 and 6. In particular, FIG. 5 illustrates shrink force in the machine direction, while FIG. 6 illustrates shrink force in the transverse direction for all ten samples.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A process for producing a shrinkable film label comprising:
heating a material comprising a non-modified polyester polymer to an extrudable state and extruding said material to form a film having at least one layer, the non-modified polyester polymer being present in the entire film in an amount greater than about 70% by weight, the non-modified polyester polymer comprising polyethylene terephthalate;
stretching the film in a longitudinal direction wherein the film is stretched at a temperature of less than about 120° C. and is stretch in an amount of from about 1 time to about 5 times of an original length of the film;
stretching the film in a lateral direction wherein the film is stretched at a temperature of less than about 120° C. and is stretch in an amount of from about 1 time to about 5 times of an original width of the film;
wherein the film is not subjected to any heat treatment or annealing after stretching;
wherein the film is capable of shrinking in both the longitudinal direction and the lateral direction when subsequently immersed in a water bath at a temperature of 80° C. for three minutes; and
forming the film into labels and attaching the labels to corresponding containers.

2. The process of claim 1, wherein the film is stretched from about 1 to about 4 times its original length in both directions.

3. The process of claim 1, wherein the film includes at least two film layers.

4. The process of claim 1, further comprising cooling the film by passing the film over a surface of a chilled roller, the surface of the chilled roller being at a temperature of less than about 30° C.

5. The process of claim 1, wherein the film shrinks from about 15% to about 40% in both the lateral and the longitudinal direction when immersed in a water bath at a temperature of 80° C. for three minutes.

6. The process of claim 1, wherein the polyester polymer is at least partially in crystalline form.

7. The process of claim 1, wherein the non-modified polyester polymer comprises the polycondensation reaction product of ethylene glycol and terephthalic acid.

8. The process of claim 1, wherein the non-modified polyester polymer is present in the entire film in an amount greater than about 90% by weight.

9. The process of claim 1, wherein the film displays a maximum shrink force in the longitudinal direction in an amount from about 5 N/15 mm to about 10 N/15 mm and a maximum shrink force in the lateral direction of from 8 N/15 mm to about 15 N/15 mm, the maximum shrink force in both the longitudinal direction and the lateral direction occurring at a temperature of from about 65° C. to about 85° C.

10. The process of claim 1, further comprising stretching the film while the film is at a temperature of less than about 80° C.

11. The process of claim 1, wherein the film shrinks at least 20% in both the longitudinal direction and the lateral direction when subsequently subjected to a temperature of 80° C. for three minutes.

12. The process of claim 1, wherein the film shrinks at least 25% in both the longitudinal direction and the lateral direction when immersed in a water bath at a temperature of 80° C. for three minutes.

13. The process of claim 1, further comprising cooling the film to a temperature that is within about 15% of the glass transition temperature of the non-modified polyester polymer.

14. The process of claim 1, wherein the non-modified polyester polymer is present in the entire film in an amount greater than about 80% by weight.

15. The process of claim 1, wherein the film is exclusive of shrink additives.

16. The process of claim 1, further comprising the step of removing the label from the container by submerging the container in a heated aqueous bath.

17. The process of claim 1, wherein the film is cooled to a temperature that is within about 30% of the glass transition temperature of the non-modified polyester polymer prior to stretching.

18. The process of claim 1, wherein the film is stretched in a lateral direction prior to being stretched in a longitudinal direction.

19. The process of claim 1, further comprising coating an exterior side of the film with an adhesive layer.

20. The process of claim 1, the label further comprising a print layer.

21. The process of claim 20, wherein the print layer is positioned between the film and an adhesive layer.

22. The process of claim 20, wherein the film is positioned between the print layer and an adhesive layer.

23. The process of claim 22, wherein the film is opaque.

24. A process for producing a shrinkable film label comprising:

heating and extruding a non-modified polyester polymer to a molten state to form a film having at least one layer, the non-modified polyester polymer being present in the entire film in an amount greater than about 70% by weight, the non-modified polyester polymer comprising polyethylene terephthalate;

stretching the film in a longitudinal direction, wherein the film is stretched at a temperature of less than about 120° C. and is stretch in an amount of from about 1 time to about 5 times of an original length of the film, and in a lateral direction, wherein the film is stretched at a temperature of less than about 120° C. and is stretch in an amount of from about 1 time to about 5 times of an original length of the film such that the film shrinks in both the lateral and the longitudinal directions when subjected to a temperature of 80° C. for three minutes; wherein the film is not subjected to any heat treatment or annealing after stretching; and forming the film into labels and attaching the label so that it may be removed from a container by submerging the container in a heated aqueous bath.

* * * * *